US011513989B2

(12) United States Patent
Lin et al.

(10) Patent No.: US 11,513,989 B2
(45) Date of Patent: Nov. 29, 2022

(54) METHOD AND COMPUTER PROGRAM PRODUCT AND APPARATUS FOR PRODUCING SOLID STATE DISK DEVICES

(71) Applicant: Silicon Motion, Inc., Zhubei (TW)

(72) Inventors: Chao-Yu Lin, Taipei (TW); Heng-Pin Liu, New Taipei (TW); Jiun-Shiang Chiou, New Taipei (TW)

(73) Assignee: SILICON MOTION, INC., Zhubei (TW)

( * ) Notice: Subject to any disclaimer, the term of this patent is extended or adjusted under 35 U.S.C. 154(b) by 123 days.

(21) Appl. No.: 17/119,400

(22) Filed: Dec. 11, 2020

(65) Prior Publication Data

US 2021/0382842 A1 Dec. 9, 2021

(30) Foreign Application Priority Data

Jun. 9, 2020 (CN) ......................... 202010516962.8

(51) Int. Cl.
*G06F 13/40* (2006.01)
*G06F 9/445* (2018.01)
*G06F 9/451* (2018.01)

(52) U.S. Cl.
CPC ...... *G06F 13/4072* (2013.01); *G06F 9/44505* (2013.01); *G06F 9/451* (2018.02); *G06F 13/409* (2013.01)

(58) Field of Classification Search
CPC .. G06F 13/4072; G06F 9/451; G06F 9/44505; G06F 13/409; G06F 3/0604; G06F 3/0617; G06F 9/4413
(Continued)

(56) References Cited

U.S. PATENT DOCUMENTS 5,745,558 A * 4/1998 Richardson, Jr. ..... H04M 3/569 379/189
6,134,616 A * 10/2000 Beatty .................. G06F 9/4418 713/323
(Continued)

FOREIGN PATENT DOCUMENTS

| CN | 100511118 C | 7/2009 |
|---|---|---|
| TW | 200414219 A | 8/2004 |

(Continued)

OTHER PUBLICATIONS

English Translation of Taiwanese Search Report for Taiwanese Application No. 109119252, dated Mar. 15, 2021.

*Primary Examiner* — Paul R. Myers
(74) *Attorney, Agent, or Firm* — Birch, Stewart, Kolasch & Birch, LLP

(57) ABSTRACT

The invention introduces a method for producing solid state disk (SSD) devices, performed by a processing unit of a production host, to include steps of: loading a port-mapping configuration table including location information regarding each port connected to the production host; comparing location information in a hardware description file with the location information in the port-mapping configuration table to determine which ports that SSD devices are connected to; displaying a graphical user interface (GUI) on a displayer to indicate which ports are connected by SSD devices; and when an SSD device connected to one port that fails to activate, updating the GUI to display information indicating that an SSD device connected to the corresponding port that fails to activate.

17 Claims, 9 Drawing Sheets

140
160
110
180
130

(58) Field of Classification Search
USPC ........................................ 710/100, 302, 304
See application file for complete search history.

(56) References Cited

U.S. PATENT DOCUMENTS 6,243,774 B1* 6/2001 Eide ..................... G06F 9/4411 713/1
8,001,287 B2* 8/2011 Bofferding ............... G06F 8/65 710/10
8,018,943 B1* 9/2011 Pleshek .................. H04L 49/90 370/254
8,831,021 B2* 9/2014 Deivasigamani ... G06F 13/4045 370/402
9,489,210 B2* 11/2016 Eide ................... G06F 9/45558
2003/0093509 A1* 5/2003 Li ...................... H04L 41/0233 709/223
2004/0034825 A1 2/2004 Jeddeloh
2005/0041596 A1* 2/2005 Yokomitsu ............. H04L 67/02 370/252
2006/0136688 A1 6/2006 Pang et al.
2006/0195848 A1* 8/2006 Arndt ................. G06F 9/45537 718/104
2009/0019211 A1* 1/2009 Bandholz ............. G06F 3/0632 711/E12.008
2009/0307384 A1* 12/2009 Liu ...................... G06F 11/221 710/19
2010/0180051 A1 7/2010 Harris
2011/0134796 A1* 6/2011 Tanizawa ........... H04L 67/1097 370/254
2012/0191884 A1* 7/2012 Brownlow ........... G06F 13/385 710/64
2012/0311222 A1* 12/2012 Bowles .............. G06F 13/4022 710/315
2013/0254402 A1 9/2013 Vibhor et al.
2013/0318392 A1* 11/2013 Guo ................... G06F 11/1068 714/6.11
2014/0137023 A1* 5/2014 Lin .................... G06F 3/04845 710/305
2014/0342670 A1* 11/2014 Kang ..................... H04L 69/14 455/67.11
2015/0317272 A1* 11/2015 Tanaka ................. G06F 13/385 710/301
2015/0378814 A1* 12/2015 Webb ................... G06F 3/0655 714/768
2016/0283112 A1 9/2016 Blankenship
2016/0357439 A1 12/2016 Uehara et al.
2017/0123872 A1 5/2017 Yigzaw et al.
2017/0374160 A1* 12/2017 Anzo ................. H04L 41/0668
2021/0117364 A1* 4/2021 Yun .................... G06F 13/4282

FOREIGN PATENT DOCUMENTS

TW 201042460 A1 12/2010
TW 201727479 A 8/2017
TW 201729084 A 8/2017
WO WO 2016/051445 A1 4/2016

* cited by examiner

METHOD AND COMPUTER PROGRAM PRODUCT AND APPARATUS FOR PRODUCING SOLID STATE DISK DEVICES

CROSS-REFERENCE TO RELATED APPLICATIONS

This application claims the benefit of priority to Patent Application No. 202010516962.8, filed in China on Jun. 9, 2020; the entirety of which is incorporated herein by reference for all purposes.

BACKGROUND

The disclosure generally relates to storage devices and, more particularly, to methods, computer program products and apparatuses for producing solid state disk (SSD) devices.

Solid state disk (SSD) devices usually need to complete the card activation processes before they can be sold out of the manufacturing factory, and the time consumed by the card activation processes is an important issue in the production of SSD devices. One production host is usually connected to 5 to 16 SSD devices through ports of its device interface and performs card-activation processes for the connected SSD devices. However, conventionally, when one of the SSD devices fails to activate, the production host cannot automatically identity which one actually has an error, and the production staff needs to manually unplug the connected SSD devices for confirmation, which lengthens the production time. Thus, it is desirable to have methods, computer program products and apparatuses for producing SSD devices to address the aforementioned problems.

SUMMARY

In an aspect of the invention, a method for producing solid state disk (SSD) devices, performed by a processing unit of a production host, is introduced to include steps of: loading a port-mapping configuration table including location information regarding each port connected to the production host; comparing location information in a hardware description file with the location information in the port-mapping configuration table to determine which ports that SSD devices are connected to; displaying a graphical user interface (GUI) on a displayer to indicate which ports are connected by SSD devices; and when an SSD device connected to one port that fails to activate, updating the GUI to display information indicating that an SSD device connected to the corresponding port that fails to activate.

In another aspect of the invention, a non-transitory computer program product for producing SSD devices is introduced to include program code and, when the program code is executed by a processing unit of a production host, the method for producing solid state disk devices as described above is performed.

In still another aspect of the invention, an apparatus for producing SSD devices is introduced to include a device I/F and a processing unit. The processing unit is arranged operably to load a port-mapping configuration table including location information regarding each port connected to the apparatus; comparing location information in a hardware description file with the location information in the port-mapping configuration table to determine which ports that SSD devices are connected to; displaying a GUI on a displayer to indicate which ports are connected by SSD devices; and when an SSD device connected to one port that fails to activate, updating the GUI to display information indicating that an SSD device connected to the corresponding port that fails to activate Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent." etc.)

Figure 1:
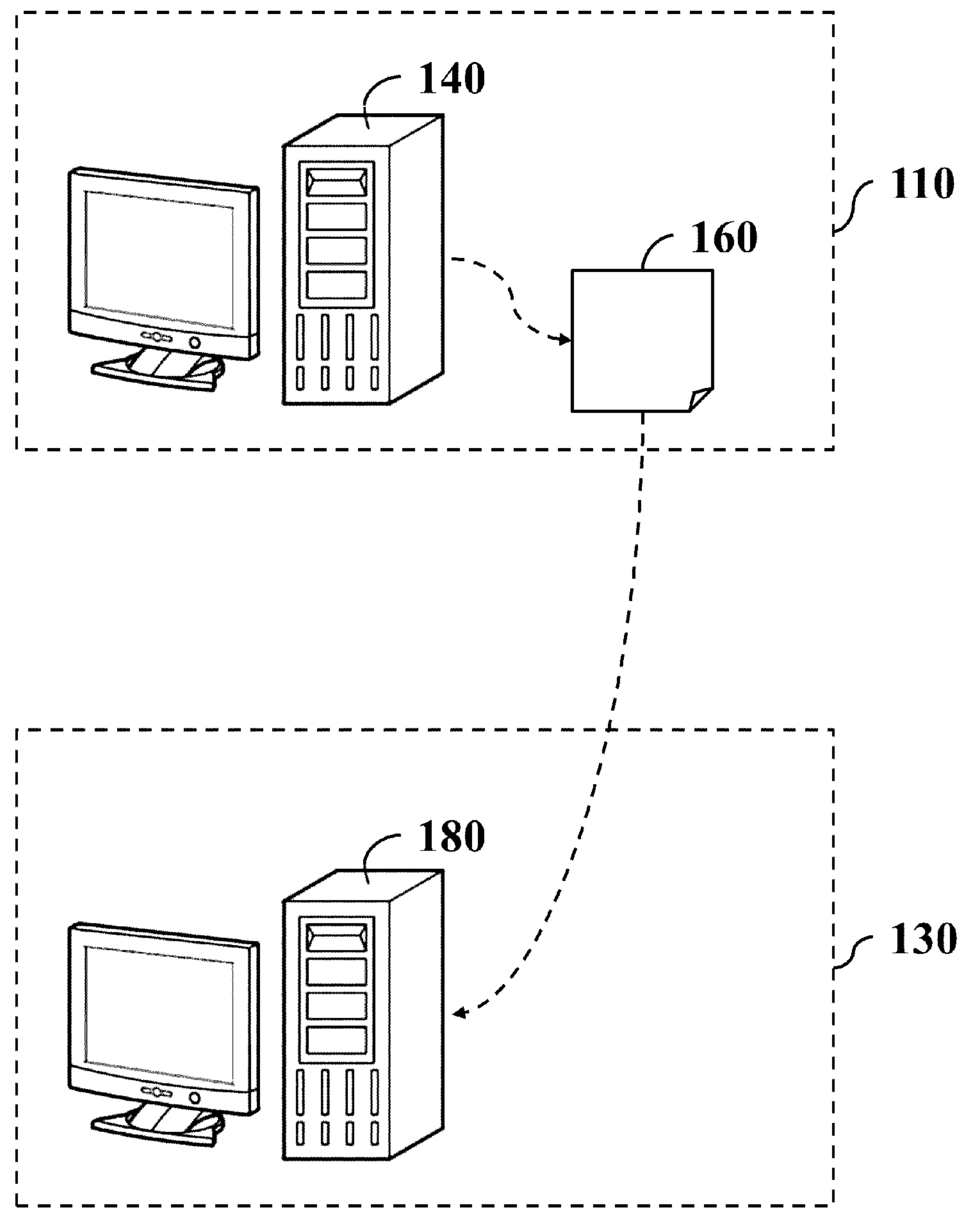
FIG. 1 is a schematic diagram for illustrating production stages according to an embodiment of the invention.

In order to allow a production computer to automatically identify the SSD device being connected to each port, an embodiment of the invention divides the entire production process into two stages: port distinguishing; and card activation. Refer to FIG. 1. In the port-distinguishing stage 110, the training computer 140 analyzes the content of the hardware description file in the operating system (OS) to obtain identification information of each physical port, such as Serial Advanced Technology Attachment/Peripheral Component Interconnect Express (SATA/PCIe) registries, a bus number, a target ID, a Logical Unit Number (LUN), etc., and generates the port-mapping configuration table 160 accordingly. In the card-activation stage 130, the production computer 180 loads the port-mapping configuration table 160 and performs card-activation processes for multiple SSD devices connected to the production host 180. During any card-activation process, if an error message is discovered, the production host 180 uses the port-mapping configuration table 160 to identify which physical port is connected to a SSD device that has an error, and displays it on the Graphical User Interface (GUI), which is helpful for the operator and/or the production computer 180 to perform troubleshooting. It is to be noted that the training computer 140 and the production computer 180 may be two computers with the same necessary software and hardware configuration, or the same computer.

Figure 2:
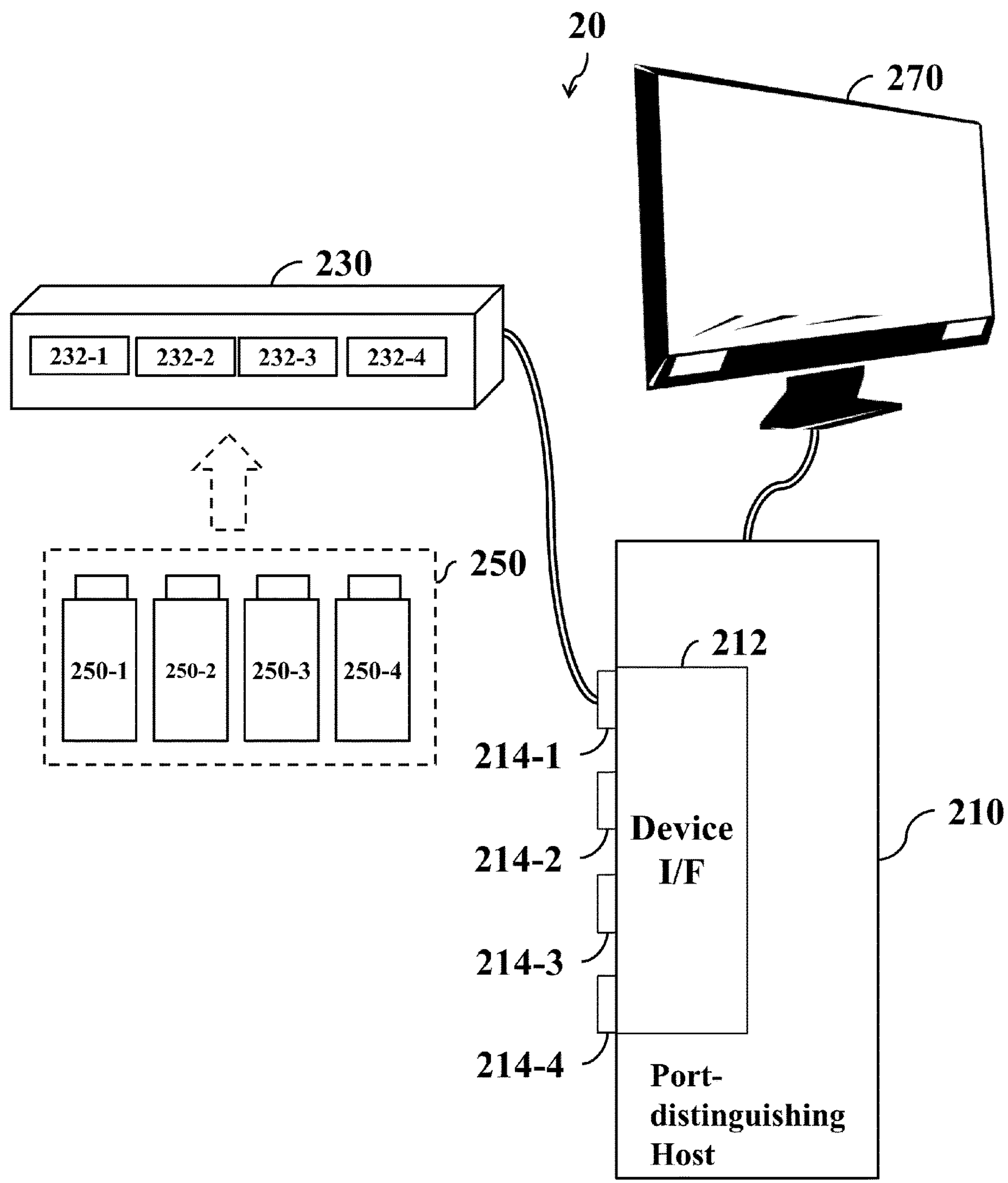
FIG. 2 is a schematic diagram illustrating a training system according to an embodiment of the invention.

Refer to FIG. 2. The training system 20 includes the port-distinguishing host 210, the hub 230, the training SSD devices 250 and the displayer 270. The training computer 140 as shown in FIG. 1 may include the port-distinguishing host 210, the hub 230 and the displayer 270. Each training SSD device 250 may contain a flash controller and a flash module. The displayer 270 may be a Thin Film Transistor Liquid-Crystal Display (TFT-LCD), an Organic Light-Emitting Diode (OLED) display, or others, to display input letters, alphanumeric characters and symbols, dragged paths, drawings, screens, or any combinations thereof in the training process for an engineer or an operator to view.

The port-distinguishing host 210 may be practiced in a Personal Computer (PC), a laptop PC, an industrial computer, a workstation, or others. The port-distinguishing host 210 includes a device interface (I/F) 212 having ports 214-1 to 214-4 and each port may be connected to one hub, for example, the port 214-1 is connected to the hub 230. Although FIG. 2 depicts the device I/F 212 is equipped with only four ports, those artisans can equip the device I/F 212 with more or fewer ports, so that the port-distinguishing host 210 can be connected to more or fewer hubs and the invention should not be limited thereby. The hub 230 contains ports 232-1 to 232-4 and each port may be connected to one training SSD device 250, such as any of the SSD devices 250-1 to 250-4. It should be noted that, for the brevity, when the disclosure is described using the singular form, the training SSD device 250, it means that the described structures, functions, process steps, other technical characteristics, or any combinations thereof can be applied to any of the training SSD devices 250-1 to 250-4. Although FIG. 1 depicts the hub 230 has four ports, those artisans can connect a hub having more or fewer ports to the port-distinguishing host 210, so that the port-distinguishing host 210 can be connected to more or fewer training SSD devices and the invention should not be limited thereby.

Figure 3:
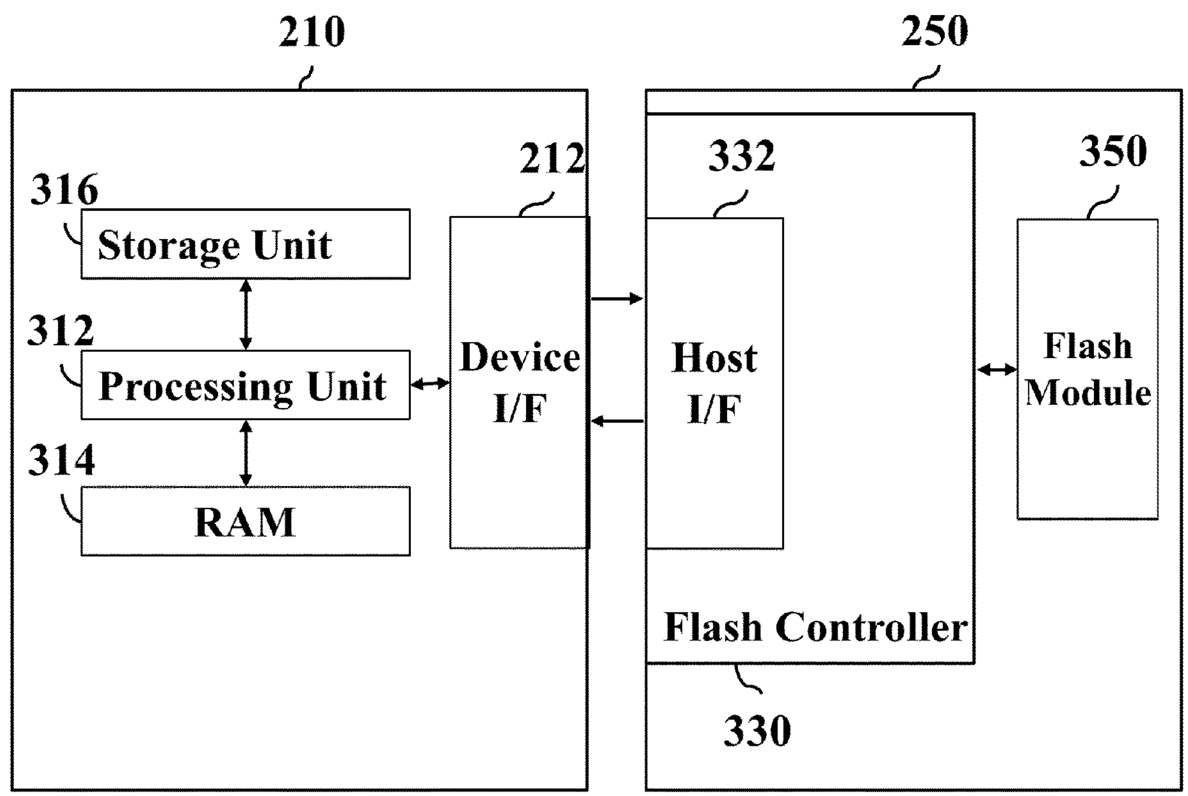
FIG. 3 is a block diagram illustrating a port-distinguishing host and a training solid state disk (SSD) device according to an embodiment of the invention.

Refer to FIG. 3. When the hub 230 is connected to a port on the device I/F 212 and the training SSD device 250 is plugged into the hub 230, it is equivalent to the training SSD device 250 being physically connected to the port-distinguishing host 210, so the hub 230 as shown in FIG. 2 is omitted from FIG. 3. The port-distinguishing host 210 includes a processing unit 312, which may be implemented in numerous ways, such as with general-purpose hardware (e.g., a single processor, a multiprocessor capable of parallel computations, a graphical processing unit, or others capable of the computation) that is programmed using software and/or firmware instructions, such as in a port-distinguishing tool, an operating system (OS), a driver, or others, to perform the functions recited herein. The processing unit 312 may issue a command to the training SSD device 250 through the device interface (I/F) 212 to perform operations required in the card-activation process.

The training SSD device 250 includes the flash controller 330 and the flash module 350. The flash module 350 provides huge storage space, typically in hundred gigabytes (GBs) or even several terabytes (TBs), for storing huge user data, for example, high-resolution images, videos, or others. The flash controller 330 includes the host I/F 332 and the host I/F 332 is coupled to the device I/F 212 of the port-distinguishing host 210.

In order to distinguish the ports 214-1 to 214-4 of the device I/F 212 and the ports 232-1 to 232-4 of the hub 230 as shown in FIG. 2, a hardware description file needs to be provide to identify the ports 214-1 to 214-4 and the ports 232-1 to 232-4, so that the software program can know that an input/output (I/O) device is connected to the port-distinguishing host 210 through which one of the ports 214-1 to 214-4 and the ports 232-1 to 232-4. For example, the Window Registry, which is a hierarchical database storing low-level settings, is provided for Microsoft Windows operating system (OS) and for applications. Specifically, the Window Registry contains information, settings, options, and other values for hardware of the port-distinguishing host 230, such as SATA/PCIe interface, etc., and for devices connected to the port-distinguishing host 210, such as SSD devices, etc. When an SSD device is connected to the port-distinguishing host 210 through a port of the bridge 230, a new subkey containing values for storing settings, such as a hardware identifier, location information, a manufacturer, a service, etc., is added to the Window Registry.

Figure 4:
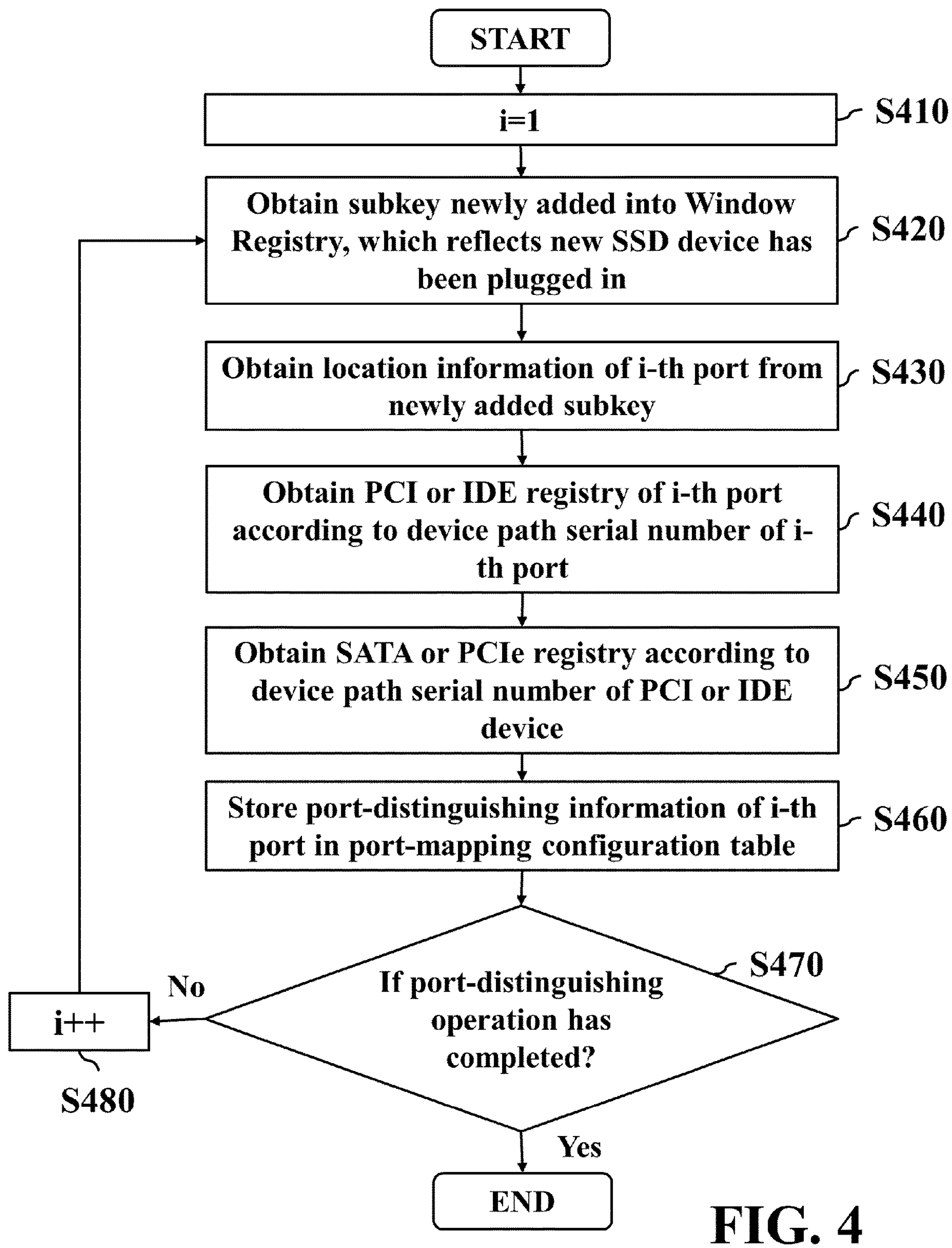
FIG. 4 is a flowchart illustrating a method for distinguishing ports according to an embodiment of the invention.

An embodiment of the invention introduces a method for distinguishing ports performed by the processing unit 312 when loading and executing program code of a port-distinguishing tool. Refer to FIG. 4. Take the Windows OS as an example and the details are described as follows:

Step S410: The variable i is set to 1. The variable i is used to record the serial number of distinguished ports.

Next, the process repeatedly executes a loop including steps S420 to S480. Before each iteration is executed, the operator plugs a training SSD device into the designated port. For example, the ports 232-1, 232-2, 232-3, and 232-4 of the hub 230 may be sequentially labeled as Port#1, Port#2, Port#3, and Port#4. After the operator plugs the training SSD device 250-1 into the port 232-1, the processing unit 312 performs steps S420 to S480 to identify Port#1. Subsequently, after the operator plugs the training SSD device 250-2 into the port 232-2, the processing unit 312 performs steps S420 to S480 to identify Port#2. The process will be repeated until all necessary ports have been identified.

Step S420: The subkey newly added into the Window Registry, which reflects a new SSD device has been plugged in, is obtained. For example, the processing unit 312 may execute the Microsoft Application Programming Interface (API) function "CreateFile" to obtain handles contained in the directory "Enum\SCSI" of the Window Registry. Then, the processing unit 312 may execute the Microsoft API function "DeviceIOControl" to inspect whether a new subkey has been added into the obtained handle. If there is a new subkey, it means that a new Small Computer System Interface (SCSI) device has been plugged, then the processing unit 312 obtains the Class Globally Unique IDentifier "ClassGUID" of the detected subkey. If there is no new subkey, the processing unit 312 may execute the Microsoft API function "CreateFile" to obtain handles contained in the directory "Enum\IDE" of the Window Registry. Then, the processing unit 312 may execute the Microsoft API function "DeviceIOControl" to inspect whether a new subkey has been added into the obtained handle. If there is a new subkey, it means that a new Integrated Drive Electronics (IDE) device has been plugged, then the processing unit 312 obtains the Class Globally Unique IDentifier "ClassGUID" of the detected subkey.

Step S430: The location information of the i-th port is obtained from the newly added subkey. For example, the processing unit 312 may execute the Microsoft API function "WINSETUPAPI SetupDiGetClassDevs" to obtain the handle "HDEVINFO" indicating to a device information set for a specific device according to the ClassGUID (obtained in step S420). The processing unit 312 may execute the Microsoft API function "WINSETUPAPI SetupDiEnumDeviceInterface" to enumerate device interfaces of the handle "HDEVINFO", where data of the device interfaces may be stored in the preset buffer of the RAM 314. The processing unit 312 may execute the Microsoft API function "WINSETUPAPI SetupDiGetDeviceInterfaceDetail" to obtain details of a device interface, which include a device path and location information. The location information includes three parts: bus number; target ID; and LUN. The location information is used to identify one of the ports 232-1 to 232-4 of the hub 230 in FIG. 2. For example, the processing unit 312 may take characters between the second and the third hashtags "#" from the device path as a string, and take characters before the last ampersand "&" from the string as a device path serial number. In an example, the processing unit 312 may retrieve the device path serial number "4&2e835db4&0" from the device path of the SCSI device "\\?\scsi#disk&ven_wdc&prod_wd10spzx-08z10#4&2e835db4&0&000200#{53f56307-b6bf-11d0-94f2-00a0c91efb8b}". In another example, the processing unit 312 may retrieve the device path serial number "5&39170d91&0" from the device path of the IDE device "\\?\ide#disksmi_disk______q0921b_#5&39170d91&0&1.0.0 #{53f56307-b6bf-11d0-94f2-00a0c91efb8b}".

Step S440: The PCI or IDE registry of the i-th port is obtained according to the device path serial number of the i-th port. The processing unit 312 may determine whether the PCI or IDE registry is to be scanned according to the information indicating in which path the newly added subkey is detected in step S420.

If the newly added subkey is stored in the path "Enum\SCSI", then the processing unit 312 scans the PCI registry. The processing unit 312 may execute the Microsoft API function "CreateFile" to obtain handles contained in the directory "Enum\PCI" of the Window Registry. The processing unit 312 may execute the Microsoft API function "DeviceIOControl" to obtain all subkeys of the handles. Subsequently, for each subkey, refer to the description recited in step S420, the processing unit 312 may execute the Microsoft API functions "WINSETUPAPI SetupDiGetClassDEVs", "WINSETUPAPI SetupDiEnumDeviceInterface" and "WINSETUPAPI SetupDiGetDeviceInterfaceDetail" to obtain the registry value "ParentIdPrifix", and compare whether the registry value "ParentIdPrifix" matches the device path serial number obtained in step S430. If they match, it means that this subkey includes the PCI registry of the i-th port, and the processing unit 312 may execute the Microsoft API function "WINSETUPAPI SetupDiGetDeviceInterfaceDetail" to obtain the PCI registry. The processing unit 312 may take characters between the second backslash "\" and the last ampersand "&" from the PCI registry as the device path serial number of the PCI device. For example, the processing unit 312 may retrieve the device path serial number "3&11583659&0" from the device path of the PCI device "PCI\VEN_8086&DEV_9D03&SUBSYS_225D17AA&REV_21\3&11583659&0&B8".

If the newly added subkey is stored in the path "Enum\IDE", then the processing unit 312 scans the PCIIDE registry. The processing unit 312 may execute the Microsoft API function "CreateFile" to obtain handles contained in the directory "Enum\PCI" of the Window Registry. The processing unit 312 may execute the Microsoft API function "DeviceIOControl" to obtain all subkeys of the handles. Subsequently, for each subkey, refer to the description recited in step S420, the processing unit 312 may execute the Microsoft API functions "WINSETUPAPI SetupDiGetClassDEVs", "WINSETUPAPI SetupDiEnumDeviceInterface" and "WINSETUPAPI SetupDiGetDeviceInterfaceDetail" to obtain the registry value "ParentIdPrifix", and compare whether the registry value "ParentIdPrifix" matches the device path serial number obtained in step S430. If they match, it means that this subkey includes the IDE registry of the i-th port, and the processing unit 312 may execute the Microsoft API function "WINSETUPAPI SetupDiGetDeviceInterfaceDetail" to obtain the IDE registry. The processing unit 312 may take characters between the second backslash "\" and the last ampersand "&" from the PCI registry as the device path serial number of the IDE device. For example, the processing unit 312 may retrieve the device path serial number "4&1dd8ffee&0" from the device path of the PCI device "PCIIDE\IDEChannel\4&1dd8ffee&0&1".

Step S450: The SATA or PCIe registry is obtained according to the device path serial number of the PCI or IDE device. The processing unit 312 may execute the Microsoft API function "CreateFile" to obtain handles contained in the directory "Enum\PCI" of the Window Registry. The processing unit 312 may execute the Microsoft API function "DeviceIOControl" to obtain all subkeys of the handles. Subsequently, for each subkey, refer to the description recited in step S420, the processing unit 312 may execute the Microsoft API functions "WINSETUPAPI SetupDiGetClassDEVs", "WINSETUPAPI SetupDiEnumDeviceInterface" and "WINSETUPAPI SetupDiGetDeviceInterfaceDetail" to obtain the registry value "ParentIdPrifix", and compare whether the registry value "ParentIdPrifix" matches the device path serial number obtained in step S440. If they match, it means that this subkey includes the SATA registry of the i-th port, and the processing unit 312 may execute the Microsoft API function "WINSETUPAPI SetupDiGetDeviceInterfaceDetail" to obtain the SATA registry.

If no matched registry can be found from the handles in the directory "Enum\PCI" of the Window Registry, the processing unit 312 may execute the Microsoft API function "CreateFile" to obtain handles contained in the directory "Enum\APCI" of the Window Registry. The processing unit 312 may execute the Microsoft API function "DeviceIOControl" to obtain all subkeys of the handles. Subsequently, for each subkey, refer to the description recited in step S420, the processing unit 312 may execute the Microsoft API functions "WINSETUPAPI SetupDiGetClassDEVs", "WINSETUPAPI SetupDiEnumDeviceInterface" and "WINSETUPAPI SetupDiGetDeviceInterfaceDetail" to obtain the registry value "ParentIdPrifix", and compare whether the registry value "ParentIdPrifix" matches the device path serial number obtained in step S440. If they match, it means that this subkey includes the PCIe registry of the i-th port, and the processing unit 312 may execute the Microsoft API function "WINSETUPAPI SetupDiGetDeviceInterfaceDetail" to obtain the PCIe registry "ACPI\P0A08\0". For example, the SATA or PCIe registry can be used to identify one of the ports 214-1 to 214-4 of the device I/F 212 as shown in FIG. 2.

Step S460: The port-distinguishing information of the i-th port is stored in the port-mapping configuration table 160 of the RAM 314 and/or the storage unit 316. The port-distinguishing information includes but not limited to the location information obtained in step S430 and the SATA or PCIe registry obtained in step S450. Table 1 shows some examples of the port-mapping configuration table 160:

TABLE 1

| Port | Bus Number | Target ID | LUN | SATA/PCIe Registry |
|---|---|---|---|---|
| Port#1 | 0 | 2 | 0 | ACPI\PNP0A08\0 |
| Port#2 | 0 | 4 | 1 | ACPI\PNP0A08\0 |
| Port#3 | 0 | 6 | 2 | ACPI\PNP0A08\0 |
| Port#4 | 0 | 8 | 3 | ACPI\PNP0A08\0 |

For example, the first to the fourth entries of the port-mapping configuration table 160 store the location information and the PCIe registries of Port#1 to Port#4, respectively.

Step S470: It is determined whether the port-distinguishing operation has completed. If so, the process ends and the port-mapping configuration table 160 is generated completely. Otherwise, the process proceeds to step S480.

Step S480: Calculate i=i+1.

After the process ends, the port-mapping configuration table 160 in the RAM 314 or the storage unit 316 of the port-distinguishing host 210 may be output to the production computer 180 for reference by a card-activation process.

It is to be noted that, since the operator inserts the training SSD devices into all ports of the hub one by one in the preset order, the sequence of the location information in the port-mapping configuration table 160 matches the preset physical arrangement of the ports of the hubs.

Figure 5:
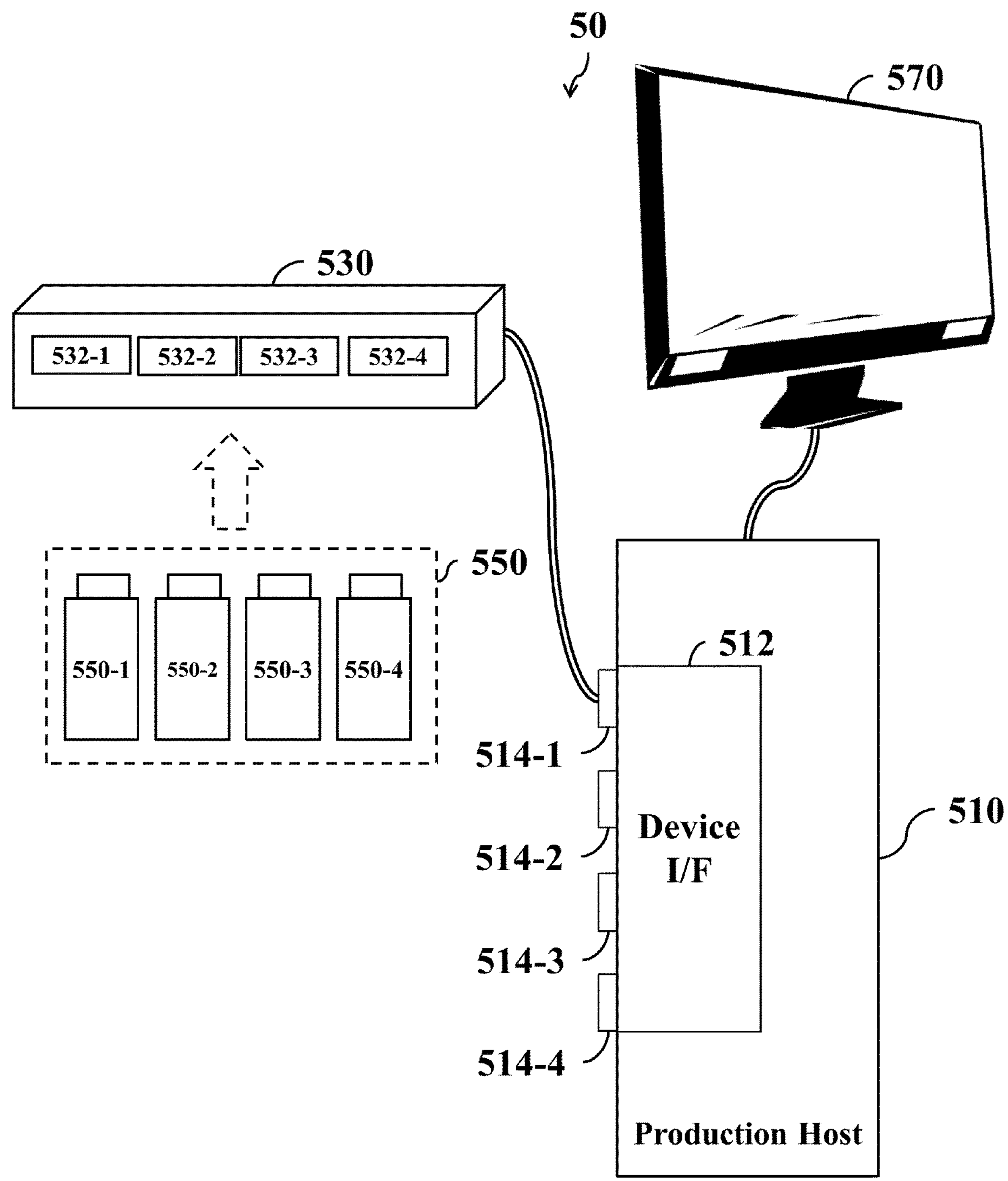
FIG. 5 is a schematic diagram illustrating a production system according to an embodiment of the invention.

Refer to FIG. 5. The production system 50 includes the production host 510, the hub 530, the SSD devices 550-1 to 550-4 and the displayer 570. Each SSD device 550 including a flash controller and a flash module being disposed on a motherboard needs to undergo a card-activation process before it can leave the manufacturing factory and be provided to a client. The displayer 570 may be a TFT-LCD, an OLED display, or others, to display input letters, alphanumeric characters and symbols, dragged paths, drawings, screens, or any combinations thereof in the training process for an engineer or an operator to view.

In regular situations, the device I/F 512 of the production host 510, and the hub 530 has the same or the matching hardware and software configurations as that of the device I/F 212 of the port-distinguishing host 210, and the hub 230. It should be noted that, for the brevity, when the disclosure is described using the singular form, the SSD device 550, it means that the described structures, functions, process steps, other technical characteristics, or any combinations thereof can be applied to any of the SSD devices 550-1 to 550-4.

Figure 6:
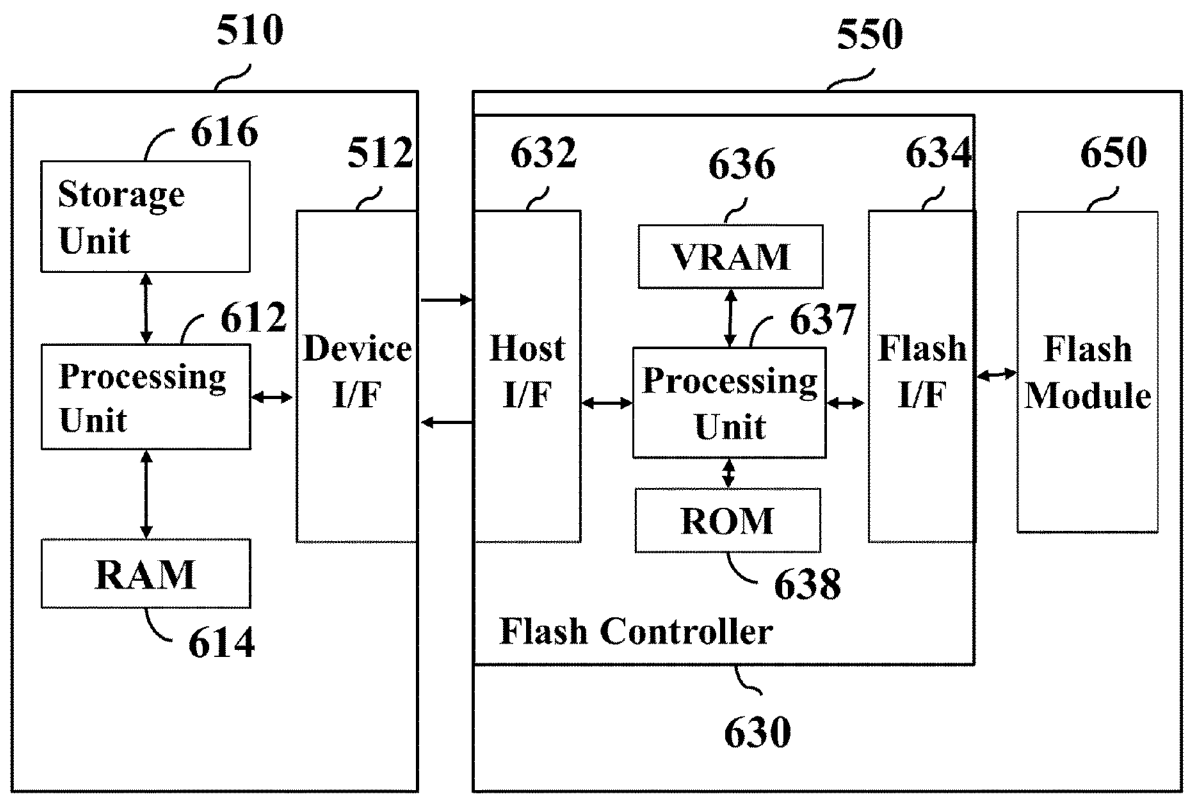
FIG. 6 is a block diagram illustrating a production host and an SSD device according to an embodiment of the invention.

Refer to FIG. 6. When the hub 530 is connected to a port on the device I/F 512 and the SSD device 550 is plugged into the hub 530, it is equivalent to the SSD device 550 being physically connected to the production host 510, so the hub 530 as shown in FIG. 5 is omitted from FIG. 6. The production host 510 includes a processing unit 612, which may be implemented in numerous ways, such as with general-purpose hardware (e.g., a single processor, a multiprocessor capable of parallel computations, a graphical processing unit, or others capable of the computation) that is programmed using software and/or firmware instructions, such as in a mass production (MP) tool, an OS, a driver, or others, to perform the functions recited herein. The processing unit 612 may issue an instruction to the device I/F 512 for sending a vendor command to the SSD device 550 to perform operations required in the card-activation process. The vendor commands are not standard host-operation commands, such as administrative commands, management commands, Input/Output (I/O) commands, and the like, defined in Universal Flash Storage (UFS), Non-Volatile Memory Express (NVMe), Open-Channel SSD, or others, but proprietary commands defined by a manufacturer of the SSD device 550 or the flash controller 630 and delivered to a client.

The production host 510 includes the storage unit 616 that may be implemented in a hard disk, an SSD drive, or other, to store the port-mapping configuration table 160. The production host 510 further includes the RAM 614 for storing variables, flags, the port-mapping configuration table 160, etc., required in the card-activation process.

The SSD device 550 includes a flash controller 630 and a flash module 650. The flash module 650 provides huge storage space, typically in hundred GBs or even several TBs, for storing huge user data, for example, high-resolution images, videos, or others. The flash module 650 may include control circuits and a memory array. Memory units of the memory array may be configured as Single Level Cells (SLCs), Multi-Level Cells (MLCs), Triple Level Cells (TLCs), Quad-Level Cells (QLCs), or any combinations thereof.

The flash controller 630 includes the host I/F 632, the flash I/F 634, the volatile random access memory (VRAM) 636, the processing unit 637, the read-only memory (ROM) 638 and the input/output (I/O) I/F 639. The flash I/F 634 is coupled to the flash module 650 and may communicate with each other using a double data rate (DDR) protocol, such as open NAND flash interface (ONFI), DDR Toggle, or others. The processing unit 637 may be practiced in the aforementioned general-purpose hardware. The ROM 638 stores program code when being loaded and executed by the processing unit 637 to perform functions required in the card-activation process. The VRAM 636 temporarily stores data, such as variables, flags, data tables, etc., required in the card-activation process.

Figure 7:
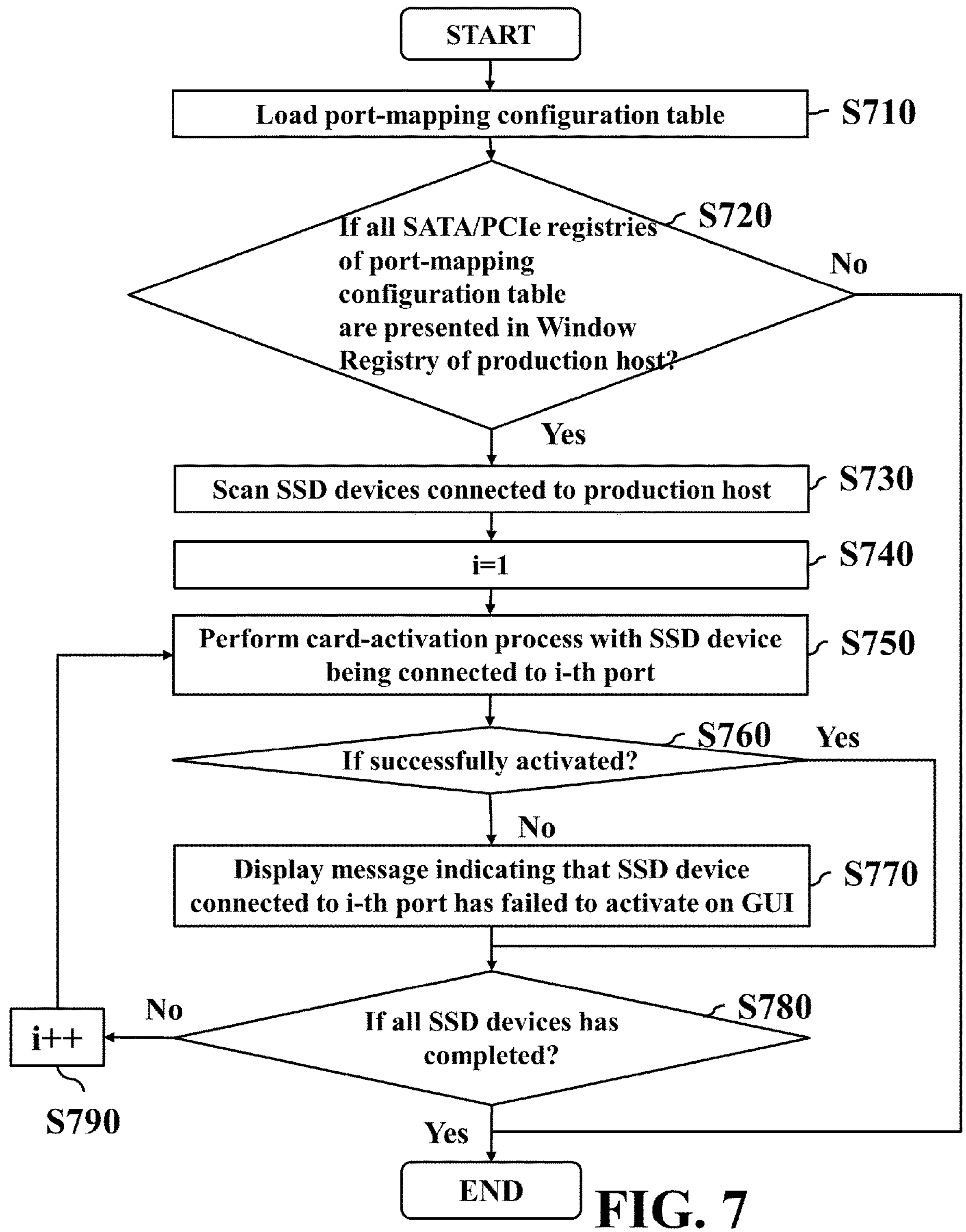
FIG. 7 is a flowchart illustrating a method for activating SSD devices according to an embodiment of the invention.

Refer to FIG. 7. An embodiment of the invention introduces a method for activating SSD devices, performed by the processing unit 612 when loading and executing program code of an MP tool. The method includes steps of: loading the port-mapping configuration table 160 that has been generated by the port-distinguishing host 210, which includes the location information of each port of the hub 530; determining whether each port of the hub 530 is connected to a SSD device by comparing location information of a hardware description file with the location information of the port-mapping configuration table 160; displaying a GUI of the displayer 570 to indicate information, whether each port of the hub 530 is connected to a SSD device; and, when a SSD device connected to one port has failed in a card-activation process, updating the GUI to indicate information that the SSD connected to the port has failed to activate. The hardware description file is provided by the OS run on the production host 510. Detailed steps are described as follows:

Step S710: The port-mapping configuration table 160 is loaded from the storage unit 616 and is stored in the RAM 614 for fast lookup. The port-mapping configuration table 160 may refer to the examples of Table 1 or Table 2 (which will be described in the following paragraphs).

Step S720: It is determined whether all SATA/PCIe registries of the port-mapping configuration table are presented in the Window Registry of the OS of the production host 510. If so, the process proceeds to step S730. Otherwise, it means that the hardware and software configuration of the training host 210 generating the port-mapping configuration table 160 is different from or does not match to that of the production host 510, and the process ends.

Specifically, for each SATA registry of the port-mapping configuration table 160, the processing unit 612 may execute the Microsoft API function "CreateFile" to obtain handles contained in the directory "Enum\PCI" of the Window Registry. The processing unit 612 may execute the Microsoft API function "DeviceIOControl" to obtain all subkeys of the handles. Subsequently, for each subkey, refer to the description recited in step S420, the processing unit 612 may execute the Microsoft API functions "WINSETUPAPI SetupDiGetClassDEVs", "WINSETUPAPI SetupDiEnumDeviceInterface" and "WINSETUPAPI SetupDiGetDeviceInterfaceDetail" to inspect whether the Window Registry includes the same SATA registries as of the port-mapping configuration table 160. When any SATA registry of the port-mapping configuration table 160 is not found in the subkeys of these handles, it means that the hardware and software configuration of the training host 210 generating the port-mapping configuration table 160 is different from or does not match to that of the production host 510.

Furthermore, for each PCIe registry of the port-mapping configuration table 160, the processing unit 612 may execute the Microsoft API function "CreateFile" to obtain handles contained in the directory "Enum\APCI" of the Window Registry. The processing unit 612 may execute the Microsoft API function "DeviceIOControl" to obtain all subkeys of the handles. Subsequently, for each subkey, refer to the description recited in step S420, the processing unit 612 may execute the Microsoft API functions "WINSETUPAPI SetupDiGetClassDEVs", "WINSETUPAPI SetupDiEnumDeviceInterface" and "WINSETUPAPI SetupDiGetDeviceInterfaceDetail" to inspect whether the Window Registry includes the same PCIe registries as of the port-mapping configuration table 160. When any PCIe registry of the port-mapping configuration table 160 is not found in the subkeys of these handles, it means that the hardware and software configuration of the training host 210 generating the port-mapping configuration table 160 is different from or does not match to that of the production host 510.

Step S730: the SSD devices 550 connected to the production host 510 are scanned. For example, refer to the description of steps S420 and S430, the processing unit 612 may execute the Microsoft API functions "CreateFile", "DeviceIOControl", "WINSETUPAPI SetupDiGetClassDEVs", "WINSETUPAPI SetupDiEnumDeviceInterface" and "WINSETUPAPI SetupDiGetDeviceInterfaceDetail" to obtain location information of all SCSI and IDE devices connected to the production host 510. Subsequently, the processing unit 612 compares the location information of all the connected SCSI and IDE devices with the location information of the port-mapping configuration table 160 to determine which ports of the production host 510 that the SSD devices 550 are connected to, and displays the detected connectivity-results in the GUI on the displayer 570. For example, the GUI may show information, which ports are connected by the SSD device 550, location information of each port, and the card-activation status for each SSD device that is connected to a port.

In some embodiments, the processing unit 612 may show the content of the location information of the hub ports that the SSD devices have connected to on the GUI, such as bus numbers, target IDs, LUNs, or any combinations thereof.

In alternative embodiments, the processing unit 612 may calculate a port number according to the bus number and the target ID of the designated port and use the port number to represent the location information of the designated port instead. Exemplary equation is provided below:

$$PN=BusN*MAX\_PCI\_TARGET\_NUM+TargetID,$$

where PN represents the port number of the designated port, BusN represents the bus number of the designated port, TargetID represents the target ID of the designated port and MAX_PCI_TARGET is a constant being set to an integer greater than 0, such as 48. Table 2 shows calculation results according to the location information of the port-mapping configuration table 160 in Table 1:

TABLE 2

| Port | Port Number | SATA/PCIe Registry |
|---|---|---|
| Port#1 | 2 | ACPI\PNP0A08\0 |
| Port#2 | 4 | ACPI\PNP0A08\0 |
| Port#3 | 6 | ACPI\PNP0A08\0 |
| Port#4 | 8 | ACPI\PNP0A08\0 |

Figure 8:
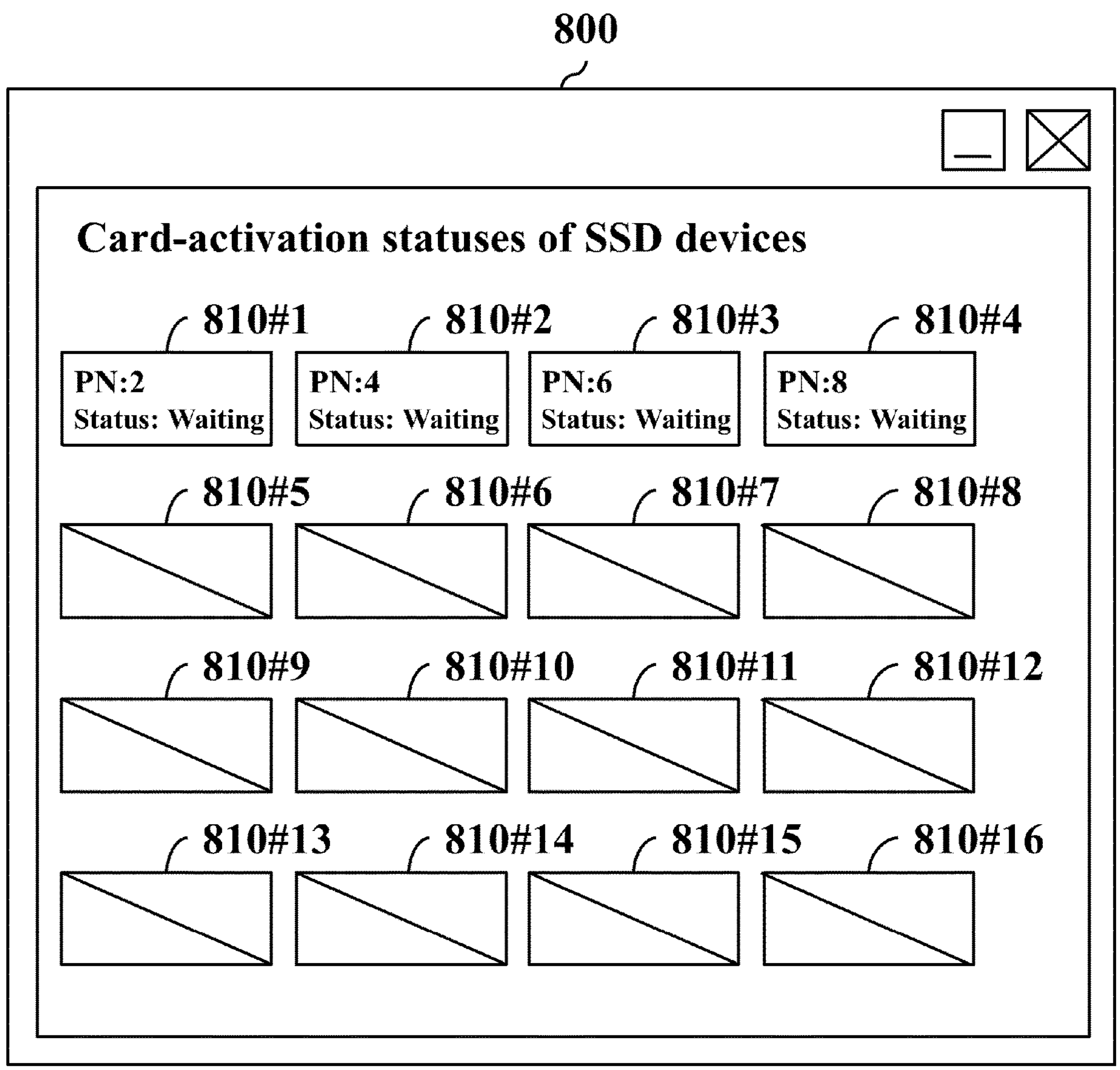
FIGS. 8 and 9 are schematic diagrams of graphical user interface according to embodiments of the invention.

Assume that the SSD devices 550-1 to 550-4 are connected to the ports 532-1 to 532-4 of the hub 530, respectively: Refer to FIG. 8. The message boxes 810#1 to 810#4 of the GUI 800 show the port numbers (as shown in FIG. 2) and the card-activation statuses of the ports P#1 to P#4, respectively. The blocks 810#5 to 810#16 of the GUI 800 are filled with backslashes to indicate that no SSD device has connected to the ports P#5 to P#16.

It is to be noted that, if only the Window Registry is searched but the port-mapping configuration table 160 as described in the embodiment of the invention is not provided, only the location information of the hub ports that all SSD devices have connected. In other words, the production host does not know the total number of ports contained in the hub, and there is no order relationship among the location information searched from the Window Registry. Therefore, even if all the location information is obtained, it cannot be related the physical arrangement of the hub ports.

Step S740: The variable i is set to 1. The variable i is used to record the sequence number of card activation.

Step S750: A card-activation process is performed with the SSD device being connected to the i-th port.

For example, in the card-activation process, the processing unit 637 may loads and executes the program code (also referred to as the vendor-command processing code) for executing vendor commands issued from the production host 110. To respond to the DEVICE INITIALIZATION vendor-command, the processing unit 637 when executing the vendor-command processing code may perform a series of tests to the flash module 650 through the flash I/F 634 for discovering bad blocks, bad columns, or others, and generating a bad-block table, a bad-column table, or others accordingly. The vendor-command processing code may calculate the length of each physical page that can be used to store the Error Check and Correction (ECC) code based on parameters, such as the detected number of bad columns, etc. The vendor-command processing code may calculate the start position of each sector of each physical page based on information, such as the detected number of bad columns, the ECC length, etc., and generate a sector start table accordingly. The vendor-command processing code may calculate a logical block address (LBA) quantity for the storage of the flash module 650 according to information, such as the detected bad-block number, the detected bad-column number, the ECC length, etc. The vendor-command processing code may store information about the tables, variables, and others, as described above in the VRAM 636 and drive the host I/F 632 to reply to the production host 510 with an initialization completion for informing the MP tool. The MP tool may display a message about the initialization completion on the displayer 570 to prompt the operator or engineer.

After receiving the initialization completion from the SSD device 650, which includes information about the LBA quantity of storage that the flash module 650 can provide, the MP tool issues a DOWNLOAD INFO vendor-command to the SSD device 650 for directing the SSD device 650 to store the initialization results in non-volatile storage space, such as the flash module 650. To respond to the DOWNLOAD INFO vendor-command, the processing unit 637 when executing the vendor-command processing code programs information about the data tables, the variables, and so on, stored in the VRAM 636 into a system block of the flash module 650 through the flash I/F 634. Those artisans may realize that the information about the data tables, the variables, and so on will be referenced by In-System Programming (ISP) code when being executed. The ISP code includes operations for executing host commands issued by a host, such as host read, write, erase commands, etc. The host commands are specified by standard development organizations, such as UFS, NVMe, and Open-channel SSD commands. The vendor-command processing code may drive the host I/F 632 to reply to the production host 510 with a download completion for informing the MP tool. The MP tool may display a message about the download completion on the displayer 570 to prompt the operator or engineer. For example, the status in one of message boxes 810#1 to 810#4 is modified with "completed".

However, the SSD device 550 may fail in an operation during the card-activation process as described above. In case that a failure has occurred, the processing unit may drive the host I/F 632 to reply to the production host 510 with a proper error code or message, so that the MP tool displays the error code or message on the displayer 570 to prompt the operator or engineer. Subsequently, the MP tool, the operator or the engineer may perform an error troubleshooting operation on the SSD device 550 connected to the i-th port.

Step S760: It is determined whether the SSD device connected to the i-th port has successfully activated according the reply message from the SSD device 550 connected to the i-th port. If so, the process ends. Otherwise, the process proceeds to step S790.

Figure 9:
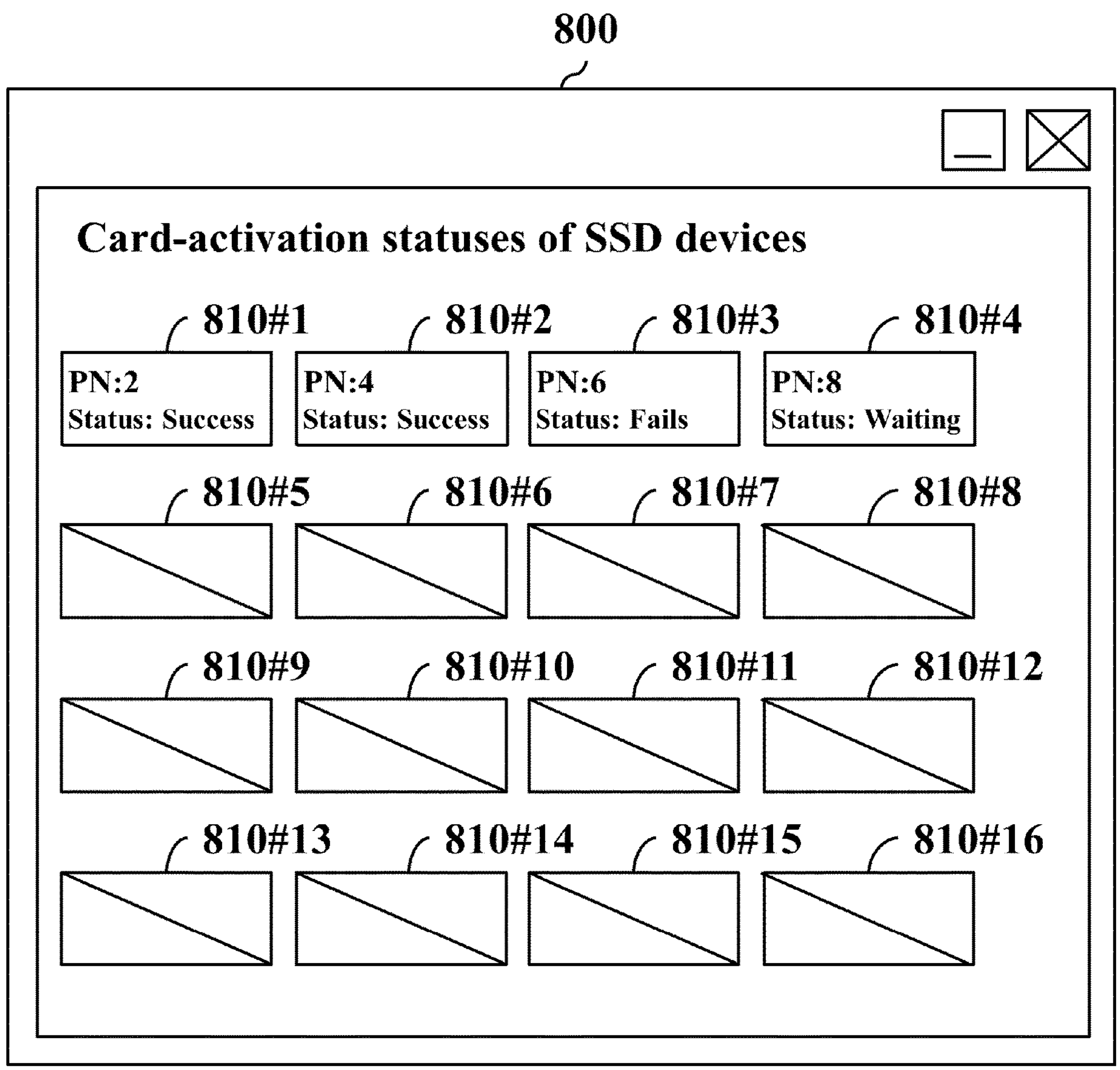

Step S770: A message indicating that the SSD device connected to the i-th port has failed to activate on the GUI. Suppose that the SSD device 550-3 has failed to activate: Refer to FIG. 9. The message box 810#3 shows that the card-activation status of the port P#3 is "failed".

Step S780: It is determined whether to complete the card-activation processes on all the SSD devices.

Step S790: Calculate i=i+1.

By comparing the port-mapping configuration table 160 as described above with the hardware description file provided by the OS run on the production host 510, it would be feasible to identify whether each port on each hub in the production system 50 is connected to an SSD device. Moreover, when one SSD device fails during its card-activation process, the MP tool would automatically identify which port that the failed SSD device is connected to.

Some or all of the aforementioned embodiments of the method of the invention may be implemented in a computer program such as a driver or a firmware program for a dedicated hardware, a software application program, or others, or any combinations thereof. Since the implementation of the various embodiments of the present invention into a computer program can be achieved by the skilled person using his routine skills, such an implementation will not be discussed for reasons of brevity. The computer program implementing some or more embodiments of the method of the present invention may be stored on a suitable computer-readable data carrier such as a DVD, CD-ROM, USB stick, a hard disk, which may be located in a network server accessible via a network such as the Internet, or any other suitable carrier.

Although the embodiment has been described as having specific elements in FIGS. 2, 3, 5 and 6, it should be noted that additional elements may be included to achieve better performance without departing from the spirit of the invention. Each element of FIGS. 2, 3, 5 and 6 is composed of various circuits and arranged operably to perform the aforementioned operations. While the process flows described in FIGS. 4 and 7 include a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for producing solid state disk (SSD) devices, performed by a processing unit of a production host, wherein the production host comprises a device interface (I/F), the device I/F comprises a plurality of first ports, each first port is connected to a hub, and each hub comprises a plurality of second ports, the method comprising:

loading a port-mapping configuration table comprising location information regarding each second port, wherein a sequence of the location information in the port-mapping configuration table matches a preset physical arrangement of the second ports of the hub;

comparing location information in a hardware description file with the location information in the port-mapping configuration table to determine which second ports that SSD devices are connected to, wherein the hardware description file is provided by an operating system (OS) run on the production host;

displaying a graphical user interface (GUI) on a displayer to indicate which second ports are connected by SSD devices; and when an SSD device connected to one of the second ports that fails to activate, updating the GUI to display information indicating that an SSD device connected to the corresponding second port that fails to activate, wherein a failure indication for failed SSD device on a port layout of updated GUI matches the preset physical arrangement of one second port of the hub, which is connected to the failed SSD device.

2. The method of claim 1, wherein the OS is Windows and the hardware description file is a Window Registry.

3. The method of claim 2, wherein the port-mapping configuration table comprises a plurality of registries associated with the first ports, the method comprising:

determining whether all the registries in the port-mapping configuration table are presented in the Window Registry;

when all the registries in the port-mapping configuration table are presented in the Window Registry, comparing the location information in the hardware description file with the location information in the port-mapping configuration table to determine which second ports that SSD devices are connected to; and when any registry in the port-mapping configuration table is not presented in the Window Registry, ending card-activation processes on SSD devices.

4. The method of claim 1, wherein the GUI shows the location information of the second ports that are connected by SSD devices.

5. The method of claim 1, wherein the GUI shows port numbers of the second ports that are connected by SSD devices, each port number is calculated by an equation:

PN=BusN*MAX_PCI_TARGET_NUM+TargetID, where PN represents the port number of one designated second port, BusN represents a bus number of the designated second port, TargetID represents a target ID of the designated second port and MAX_PCI_TARGET is a constant being set to an integer greater than 0.

6. A non-transitory computer program product for producing solid state disk (SSD) devices when executed by a processing unit of a production host, wherein the production host comprises a device interface (I/F) and the device I/F comprises a plurality of first ports, each first port is connected to a hub, and each hub comprises a plurality of second ports, the non-transitory computer program product comprising program code to:

load a port-mapping configuration table comprising location information regarding each second port, wherein a sequence of the location information in the port-mapping configuration table matches a preset physical arrangement of the second ports of the hub;

compare location information in a hardware description file with the location information in the port-mapping configuration table to determine which second ports that SSD devices are connected to, wherein the hardware description file is provided by an operating system (OS) run on the production host; and display a graphical user interface (GUI) on a displayer to indicate which second ports are connected by SSD devices; and when an SSD device connected to one of the second ports that fails to activate, update the GUI to display information indicating that an SSD device connected to the corresponding second port that fails to activate, wherein a failure indication for failed SSD device on a port layout of updated GUI matches the preset physical arrangement of one second port of the hub, which is connected to the failed SSD device.

7. The non-transitory computer program product of claim 6, wherein the OS is Windows and the hardware description file is a Window Registry.

8. The non-transitory computer program product of claim 7, wherein the port-mapping configuration table comprises a plurality of registries associated with the first ports, the non-transitory computer program product comprising program code to:

determine whether all the registries in the port-mapping configuration table are presented in the Window Registry;

when all the registries in the port-mapping configuration table are presented in the Window Registry, compare the location information in the hardware description file with the location information in the port-mapping configuration table to determine which second ports that SSD devices are connected to; and when any registry in the port-mapping configuration table is not presented in the Window Registry, end card-activation processes on SSD devices.

9. The non-transitory computer program product of claim 6, wherein the GUI shows the location information of the second ports that are connected by SSD devices.

10. The non-transitory computer program product of claim 9, wherein the location information of each second port that are connected by an SSD device comprises a bus number and a target ID of the connected second port.

11. The non-transitory computer program product of claim 6, wherein the GUI shows port numbers of the second ports that are connected by SSD devices, each port number is calculated by an equation:

PN=BusN*MAX_PCI_TARGET_NUM+TargetID, where PN represents the port number of one designated second port, BusN represents a bus number of the designated second port, TargetID represents a target ID of the designated second port and MAX_PCI_TARGET is a constant being set to an integer greater than 0.

12. An apparatus for producing solid state disk (SSD) devices, comprising:

a device interface (I/F), comprising a plurality of first ports, wherein each first port is connected to a hub, and each hub comprises a plurality of second ports; and a processing unit, coupled to the device I/F, arranged operably to load a port-mapping configuration table comprising location information regarding each second port from a storage unit, wherein a sequence of the location information in the port-mapping configuration table matches a preset physical arrangement of the second ports of the hub; compare location information in a hardware description file with the location information in the port-mapping configuration table to determine which second ports that SSD devices are connected to, wherein the hardware description file is provided by an operating system (OS) run on the apparatus; display a graphical user interface (GUI) on a displayer to indicate which second ports are connected by SSD devices; and when an SSD device connected to one of the second ports that fails to activate, update the GUI to display information indicating that an SSD device connected to the corresponding second port that fails to activate, wherein a failure indication for failed SSD device on a port layout of updated GUI matches the preset physical arrangement of one second port of the hub, which is connected to the failed SSD device.

13. The apparatus of claim 12, wherein the OS is Windows and the hardware description file is a Window Registry.

14. The apparatus of claim 13, wherein the port-mapping configuration table comprises a plurality of registries associated with the first ports, and the processing unit is arranged operably to determine whether all the registries in the port-mapping configuration table are presented in the Window Registry; when all the registries in the port-mapping configuration table are presented in the Window Registry, compare the location information in the hardware description file with the location information in the port-mapping configuration table to determine which second ports that SSD devices are connected to; and when any registry in the port-mapping configuration table is not presented in the Window Registry, end card-activation processes on SSD devices.

15. The apparatus of claim 12, wherein the GUI shows the location information of the second ports that are connected by SSD devices.

16. The apparatus of claim 15, wherein the location information of each second port that are connected by an SSD device comprises a bus number and a target ID of the connected second port.

17. The apparatus of claim 12, wherein the GUI shows port numbers of the second ports that are connected by SSD devices, each port number is calculated by an equation:

$$PN=BusN*MAX\_PCI\_TARGET\_NUM+TargetID,$$

where PN represents the port number of one designated second port, BusN represents a bus number of the designated second port, TargetID represents a target ID of the designated second port and MAX_PCI_TARGET is a constant being set to an integer greater than 0.

* * * * *